United States Patent [19]

Roméas

[11] 4,015,285
[45] Mar. 29, 1977

[54] METHOD OF RECORDING TELEVISION SIGNALS ON A DATA CARRIER AND A RECORDING OBTAINED BY SAID METHOD

[75] Inventor: René Roméas, Paris, France

[73] Assignee: Thomson-Brandt, Paris, France

[22] Filed: Jan. 9, 1975

[21] Appl. No.: 539,625

[30] Foreign Application Priority Data

Jan. 11, 1974  France .............................. 74.01033

[52] U.S. Cl. .............................. 358/4; 179/100.3 V; 358/128
[51] Int. Cl.² ......................................... H04N 5/76
[58] Field of Search ............ 358/4, 8; 178/6.6 DD, 178/6.6 FS, 6.6 SF; 360/10, 11, 33, 34, 35; 179/100.3 V

[56] References Cited

UNITED STATES PATENTS

| 3,170,031 | 2/1965 | Okanura ...................... 178/6.6 DD |
| 3,796,825 | 3/1974 | Redlich et al. ........................ 11/11 |
| 3,852,520 | 12/1974 | Brech .................................... 358/4 |

Primary Examiner—Raymond F. Gardillo, Jr.
Attorney, Agent, or Firm—Cushman, Darby & Cushman

[57] ABSTRACT

The invention relates to the recording of television signals upon an optically readable data carrier. The invention provides a method which consists in recording video information line by line on each track element. A revolution of the recording involves an even number of equal recording sections alloted to a sequence of signals items representative of the line succession.

12 Claims, 15 Drawing Figures

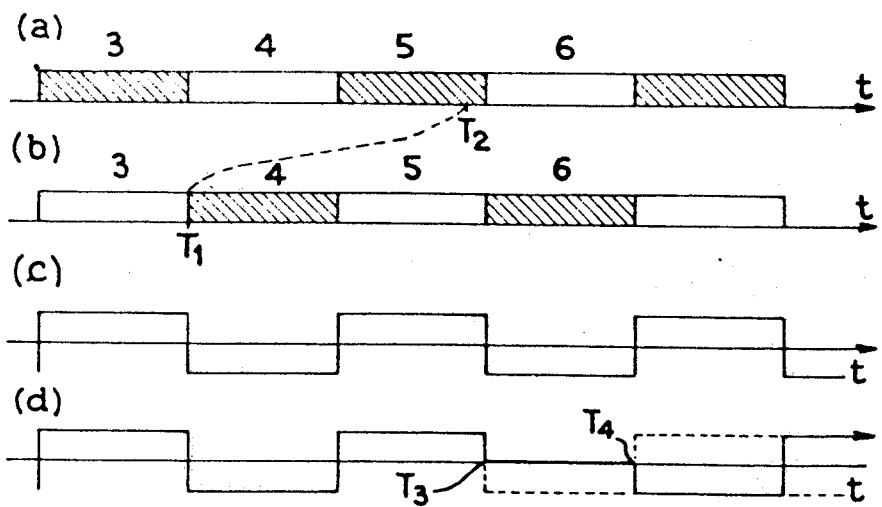
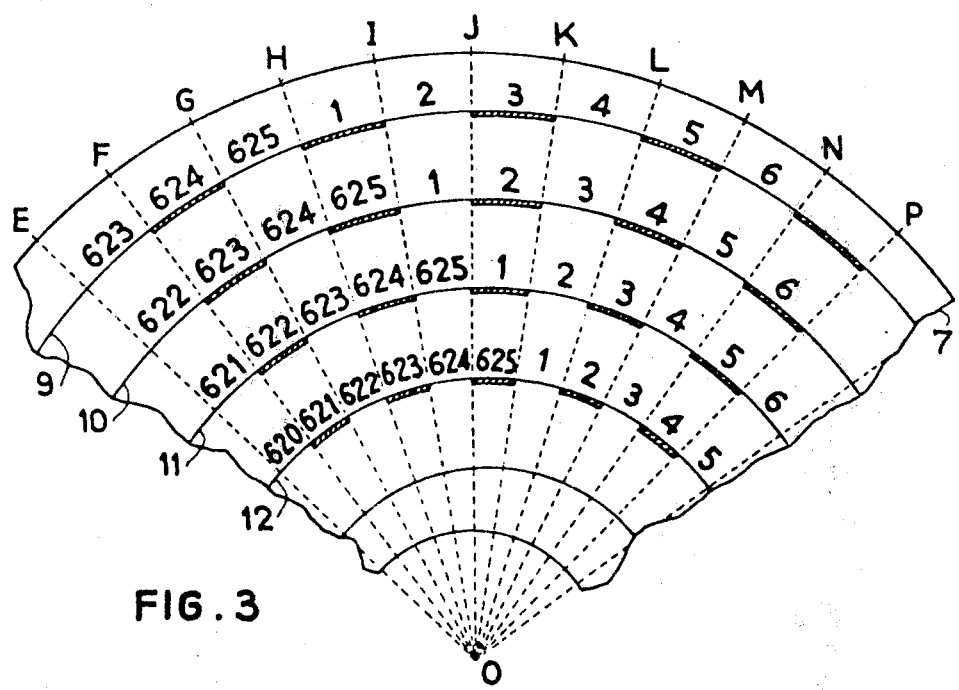

METHOD OF RECORDING TELEVISION SIGNALS ON A DATA CARRIER AND A RECORDING OBTAINED BY SAID METHOD

The present invention relates to the recording of television signals for the purpose of subsequent disseminating through the medium of an optically readable data carrier. It is well known to record television signals on the surface of a disc-shaped data carrier, using a pattern of track elements which are read out successively by means of a read-out spot with each revolution of the disc. It is well known that current television standards are designed in such a way as to scan the television image in the form of two interlaced fields, and that each frame is made up of an odd number of scanned lines.

Thus, in Europe, there are 625 line and 819 line television systems and in the U.S. a 525 line system. This being the case, it is known to record video frequency signals satisfying these television standards, by recording a frame in a track element corresponding to a single revolution on the part of the data carrier. In view of the fact that a 625 line frame is transmitted 25 times per second, those skilled in the art will appreciate that the data carrier must be rotated at 1500 revolutions per minute at the time of read-out and the read-out spot must be moved from one track element to the next with each revolution of the data carrier. If the track takes the form of a spiral the track elements are constituted by turns of the spiral and it is merely necessary to shift the read-out spot radially in order to move uniformly from one turn of the spiral to the next.

The recording of a frame per revolution of the data carrier has the advantage, as far as black-and-white operations are concerned, of making the sudden shifts from one track element to the next, virtually imperceptible, because lines of the same order in the two consecutive frames occupy the same angular position on the data carrier and differ very little from one moving image to the next. The recording of a frame by a revolution of the data carrier also ensures proper synchronization of the line-scan function of the television receiver screen, but in the case of colour television receivers which utilise the transmitted chrominance signals in an alternate way, very obvious disturbances in the image are observed when sudden shifts on the part of the read-out spot from one turn of the spiral to the next, take place. This defect occurs in particular with sequential television systems of the SECAM and PAL kinds, and is attributable to the fact that the switch responsible for directing the components of the chrominance signal, temporarily becomes unsynchronised as a consequence of shift of the read-out spot from one turn of the spiral to the next.

In order to overcome the drawback referred to hereinbefore, the invention proposes that television signals should be arranged at the surface of a data carrier which has an axis of rotation, in such a fashion that chrominance signals having the same angular position on the data carrier and located in two contiguous track elements, are of the same kind.

In accordance with the present invention, there is provided a method of recording a television signal at the surface of a rotatable data carrier, said signal comprising a sequence of items respectively carrying video information pertaining to the successive scan lines of a television image, said method comprising the steps of recording said items in the form of a pattern of track elements lying in said surface, splitting each of said track elements into successive equal sections of a revolution of said data carrier, and respectively storing said sequence of items within said successive equal sections; two items of said sequence stored along immediately adjacent track elements and located within one of said successive equal sections being separated from one another by an odd number of intermediate items.

The invention likewise relates to a recording obtained by the method in question.

For a better understanding of the invention, and to show how the same may be carried into effect reference will made to the ensuing description and the attached figures among which:

FIG. 2 is an explanatory diagram;

FIG. 3 illustrates a fragment of a disc recording in accordance with the invention;

Figure 1:
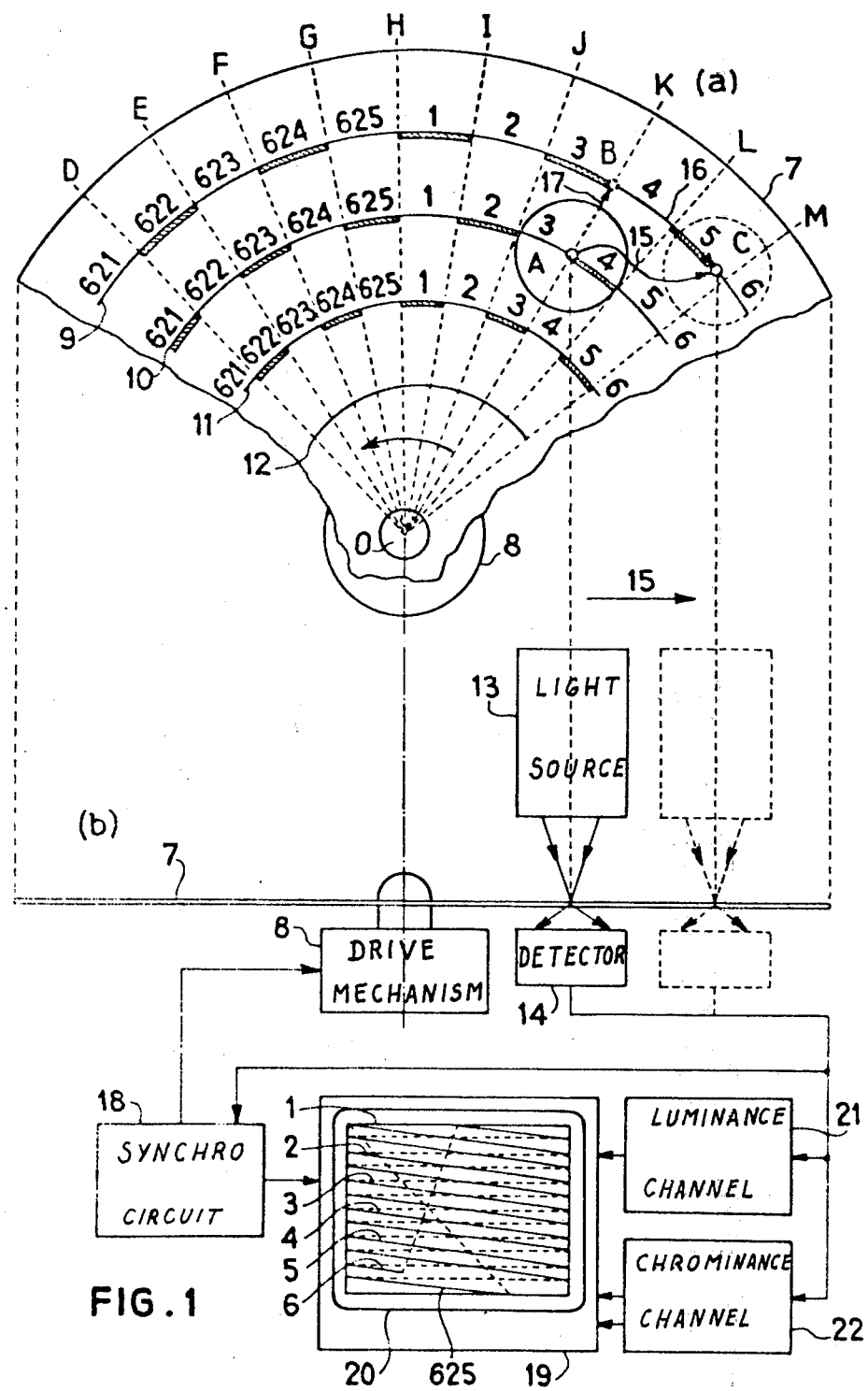
FIG. 1 illustrates in plan and elevation, a disc recording of known type, along with its associated read-out equipment.

In FIG. 1, a fragment of a recording, 7, of a disc kind, can be seen, at the surface of which television signals have been recorded in track elements 9, 10, 11 and 12. The surface of the disc 7 has been split into equal angular sectors, by broken-line radii issuing from the centre O and passing respectively through the points D, E, F, G, H, I, J, K, L and M.

In FIG. 1, the track elements 9, 10, 11 and 12 are the successive turns of a spiral track. The method of recording the television signals, as illustrated in FIG. 1, comes down to assigning to each of the recording ranges obtained by the subdivision of the spiral turns into angular sectors, a number which defines the order of the corresponding scan line of the complete television field. Thus, in the angular sector HOI, it is the first lines of the successive fields which are recorded in the sections of the track elements 9, 10, 11 and 12; the second lines of the same fields are recorded in the sector IOJ and, over a revolution, the 625th lines are recorded in the sector GOH. The read-out of the recording 7 requires that the latter should be rotated about the centre O by means of a uniform speed drive mechanism 8, and also requires that there should be projected on to the track a read-out spot A furnished by a radially-displacing read-out system 15 comprising a light source 13 and a photodetector 14. The voltage produced by the photodetector 14 is a waveform carrying video frequency and audio information, characterising the recorded television programme. This voltage is received by a television receiver 19 upon the screen 20 of which the interlaced fields are reconstituted. In order to clarify the explanation, from the receiver 19 the synchronising elements 18 and the circuits 21 and 22 respectively responsible for the transmission of the luminance signal and the two alternating components of the chrominance signal, have been extracted. The chrominance circuit 22, in the case of sequential colour television systems, comprises a switching element operating at the line frequency and appropriately switching the two chrominance components. On the disc recording 7, the sections which contain one of the chrominance components utilised for the reconstitution of the colour image, have been cross-hatched; the intermediate sections, not cross-hatched, contain the other chrominance component.

The method of recording shown in FIG. 1 is that which is currently adopted in the case of a 625 line television standard. With each revolution of the data carrier 7, a frame is recorded and when the read-out spot A successively scans the track elements 9, 10, 11, 12 following the spiral track, synchronism is achieved between the scanning of the recorded sections and the scanning of the screen 20.

If, during read-out the spot A jumps from the track element 10 to the track element 9 along the path 15 terminating at C, everything happens as if the spot had made a sudden radial shift 17, bringing it to B, followed by a uniform displacement 16 along the track arc BC. The sudden radial shift 17 is the only thing which could disturb the operation of the television receiver since the displacement BC involves no loss of synchronism despite the momentary interruption of the read-out signal.

As far as the luminance signal recorded with each scan line is concerned, the sudden radial shift produces nothing more than an imperceptible disturbance in the image since, in view of the method of recording, it is a substitution of lines of the same order into successive frames, which is involved.

By contrast, as far as the chrominance signals, which are alternately exploited from one line to the next, are concerned, the sudden radial shift reverses the chrominance components. In FIG. 1, it can be seen that prior to the sudden shift, at A a start is made with the reading of a cross-hatched section and that after the sudden shift, at B the read-out of a non cross-hatched section is commenced. The inversion of the chrominance components can be ascribed to the fact that a revolution corresponds to the recording of an odd number of scan lines. The result, because of the alternation of the chrominance components, is that the scan lines belonging to two contiguous track elements and located in the same angular sector, are not of the same kind as far as the chrominance components are concerned. The switch in the circuit 22 cannot, therefore, continue to properly select the two chrominance components and it is necessary to introduce a delay in order for proper operation to be restored after resynchronisation. The sudden shift is translated, therefore, by an interruption or temporary reversal of the chrominance signals, which is very marked in the colour image reconstituted on the screen of the receiver 19.

The presence of shifts at the time of read-out of a track, may be accidental or systematic. In the former case, the centring of the read-out spot in relation to the track can no longer be corrected by the positional control mechanism provided for the purpose. In the other case, special image-stop effects, delay or acceleration effects, are desired and their production requires track shifts which are produced with each revolution or fraction of a revolution, of the disc. The track shifts are therefore inevitable or necessary, in the course of read-out.

The effect of a track shift has been schematically illustrated in the diagram of FIG. 2, in the case of a recording method already employed in the context of a television standard using an odd number of lines.

At (a), there can be seen the read-out signal belonging to a sequence of lines 3, 4, 5, 6 as illustrated in the case of the track element 9. The cross-hatched sections represent the odd-numbered lines whose chrominance component R − Y, is being used; the non cross-hatched section represent the even-numbered lines whose chrominance component B − Y, is being used. At (b), there has been illustrated the signal pertaining to a sequence of homologous lines 3, 4, 5, 6 as occurring in a neighbouring track element 10. The cross-hatched ranges are offset by one slot, since the number of lines per revolution is odd. At (c), there can be seen the square wave voltage used to control the switch of the television receiver at the time of read-out of the track element 10. At (d) there can be seen the square wave voltage which has experienced a disturbance because of a sudden shift on the part of the read-out spot which has taken place between the instants $T_1$ and $T_2$. Between the instants $T_3$ and $T_4$, the square voltage disappears and from $T_4$ onwards, it reappears this time with the reverse phase.

To overcome the drawback constituted by the momentary interruption of operation of the switch and its reversal of operation after a track shift, the invention proposes that there should be grouped within one and the same angular sector all the chrominance components of one and the same kind, so that a sudden radial shift cannot bring about desynchronising of the switch.

FIG. 3 illustrates the method of recording in accordance with the invention. It has been chosen to illustrate the case of a spiral track arranged upon a disc with a centre of rotation O, however, the invention is equally applicable to any other kind of design employing a pattern of track elements. Conceivably therefore, a helical track arranged upon the cylindrical surface of a data carrier could be used.

In FIG. 3, it can be seen that the recording section located in one and the same angular sector, all relate to chrominance components of the same kind. The components R − Y for example, are located in the sectors HOI, JOK, . . . whilst the components B − Y, are located in the sectors IOJ, KOL, . . . In order to achieve this result in the case of a television standard using an odd number N of lines, the lines are recorded at the rate of (N) ± (a) angular sectors per revolution, a being an odd number.

In FIG. 3, the disc is split into 624 equal angular sectors and recording of the 625 lines of a scanned frame, requires 1 and 1/624th revolutions. By slightly increasing the speed of rotation of the disc in FIG. 3, in comparison with that shown in FIG. 1, it is possible to read out 625 lines in 40 milliseconds, double the field-scan periodicity. The synchronising elements 18 and the switch responsible for selecting the chrominance components, do not experience any desynchronisation during track shifts, but there is nevertheless a slight disturbance in the image as far as the luminance signal is concerned. In other words, a track shift means that the information belonging to a line is replaced by that belonging to another line which does not occupy the same position in the frame. This substitution is imperceptible as long as the offset has been chosen small. This is the reason why the offset is chosen preferably equal to more or less one line.

Figure 4:
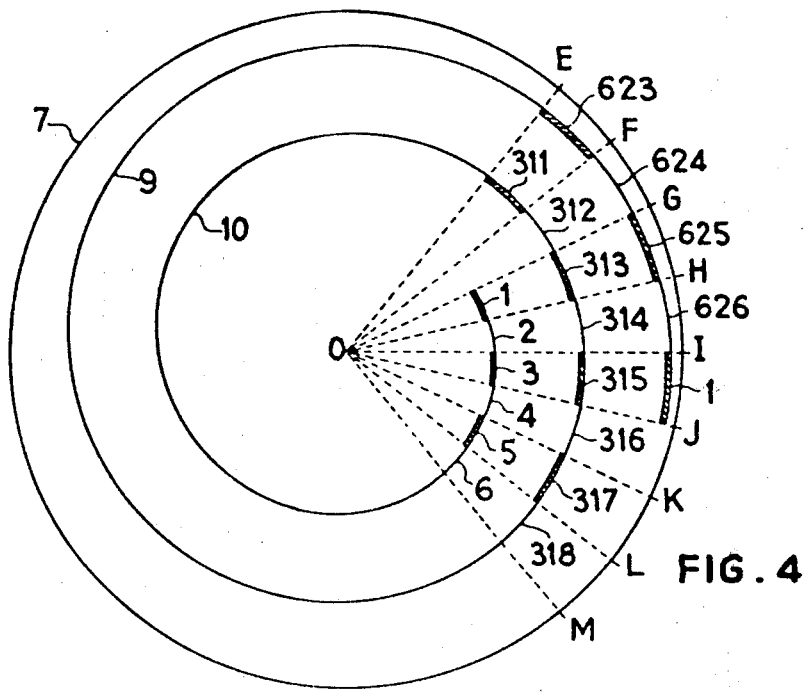
FIG. 4 illustrates a variant embodiment of the disc recording made in accordance with the invention.

In FIG. 4, another possible design on the part of the television signals, can be seen. In this case, we are concerned with a television standard utilising an even number of lines per frame. By way of example, a 626 line standard has been chosen, that is to say a number of lines double an odd number. The principle of the invention is applied by assuming that two revolutions of the disc are required in order to record a frame. The lines 1 to 312 are recorded in the track element 10, the lines 313 to 624 in the track element 9, and the lines 625 to 626 in the next track element. Thus, there is an offset of two lines per frame recorded during two consecutive revolutions of the disc 7. At the time of read-out, the disc rotates substantially twice as fast as the disc shown in FIG. 3, that is to say at 3000 revolutions per minute if one assumes a field scan function of 25 frames per second.

Figure 5:
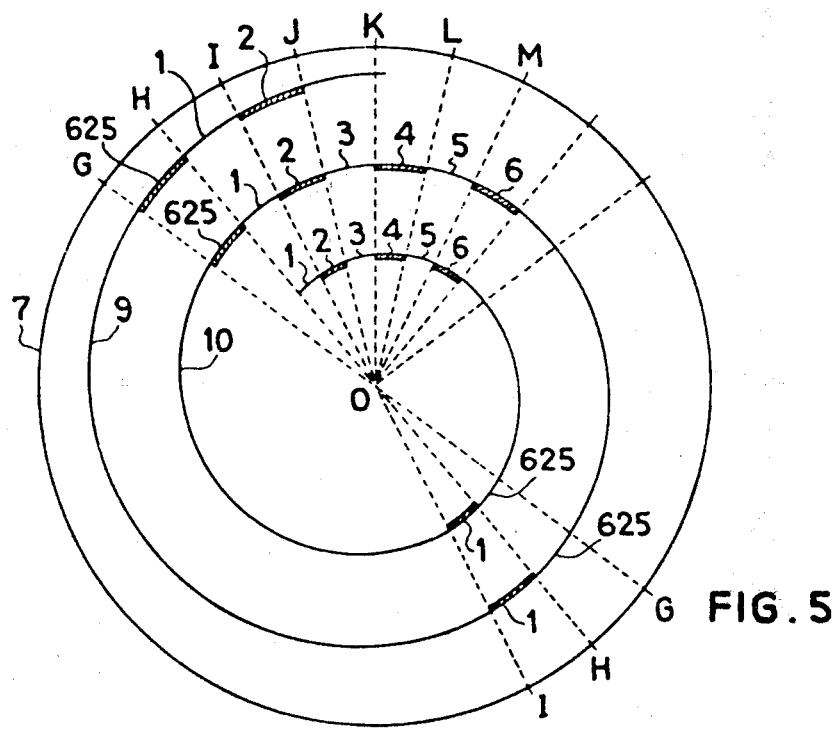
FIG. 5 illustrates another variant embodiment of the disc recording made in accordance with the invention.

In FIG. 5, another possible design on the part of the television signals, for a 625 line standard, can be seen. In accordance with this design, two frames are recorded with each revolution of the disc 7. The lines 1 to 625 of a first frame are recorded in the first half of the track element 10, and the lines 1 to 625 of a second frame are recorded in the second half of the track element 10, and so on. The disc is read-out at the rate of 750 revolutions per minute and it can be seen that track shifts can neither produce desynchronising of the switch nor any change in order of the field of the line being read out. In other words, in one and the same angular sector, there occur homologous lines and chrominance components of the same kind.

What I claim is:

1. A method of recording a color television signal at the surface of a rotatable data carrier, said signal comprising a sequence of items respectively carrying video information pertaining to the successive scan lines of a television image, said sequence having alternate lines with alternate color phase, said method comprising the steps of: rotating said record carrier at uniform speed; recording said items in the form of a track made of successive turns lying in said surface; splitting each said turns into N successive equal sections of a revolution of said data carrier, and respectively storing said sequence of items within said successive equal sections; two items of said sequence stored along immediately adjacent turns and located within one of said successive equal sections being separated from one another by an odd number of intermediate items; N being an even integer differing by an integer from the number of said scan lines in one frame of said color television signal; said uniform speed being adjusted for making said items register with said equal sections.

2. A method as claimed in claim 1, wherein said data carrier is a disc; said turns being constituted by the turns of a spiral.

3. A method as claimed in claim 1, wherein for recording a television signal comprising an odd number of lines per frame, said method consists in the recording of an even number of said items on each of said turns and with each revolution of said data carrier.

4. A method as claimed in claim 3, wherein said even number of items and said odd number of lines differ from one another by one unit.

5. A method as claimed in claim 1, wherein for recording a television signal comprising twice an odd number of lines per frame, said method consists in the recording of an even number of said lines on each of said turns, this with each revolution of said data carrier.

6. A method as claimed in claim 5, wherein said even and odd numbers differ from one another by one unit.

7. Record of color television signals comprising: a sequence of items respectively carrying video information pertaining to successive scan lines of a television image, said sequence having alternate lines with alternate color phase, said record comprising a data carrier having a rotation axis, and at the surface of which said television signals are recorded in accordance with a track made of successive turns lying in said surface; each said turns being subdivided into N successive equal sections of a revolution of said data carrier; said N equal sections respectively storing said sequence of items; the number N of said equal sections per revolution, being an even number differing by an integer from the number of said scan lines in one frame of said color television signals.

8. Record as claimed in claim 7, wherein said data carrier is a disc; turns being the turns of a spiral.

9. Record as claimed in claim 7, wherein said television frame comprises an odd number of lines.

10. Record as claimed in claim 9, wherein said odd number differs by one unit, from said even number N.

11. Record as claimed in claim 7, wherein said frame comprises a number of lines equal to twice an odd number, said odd number being close to said even number N.

12. Record as claimed in claim 11, wherein said odd number differs by one unit from said even number N.

* * * * *